Feb. 3, 1931.   L. J. B. DIDIER   1,790,978
THREE-COLOR CINEMATOGRAPH FILM
Filed June 5, 1928
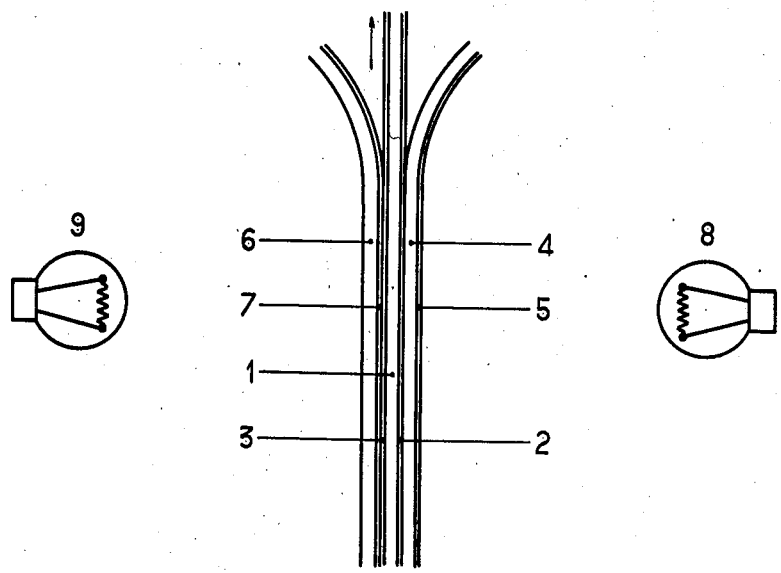

Patented Feb. 3, 1931

1,790,978

UNITED STATES PATENT OFFICE

LÉON JEAN BAPTISTE DIDIER, OF PARIS, FRANCE

THREE-COLOR CINEMATOGRAPH FILM

Application filed June 5, 1928, Serial No. 283,037, and in France October 19, 1927.

This invention relates to an improved process for printing three color cinematograph films.

In three color photography according to the process of Ducos du Hauron three screened negatives are first obtained which represent three fundamental colors of the subject, such as blue-violet, green and red. These three black negatives are then used for producing properly colored positive prints which are superposed and so produce a three color picture of the subject.

Many different processes are known to-day for obtaining the superposition of the three single color prints and all these known processes necessitate delicate and difficult operations.

The object of the present invention is in improved process for printing the three colors of a colored photograph, which is simple in operation and which is particularly well adapted for making three color cinematograph films.

According to the invention, three screened negative films are first produced in a cinematographic camera adapted for this purpose. These three negative films correspond for instance to blue-violet, red-orange and green of the subject. They are each printed on a single positive film with the proper colors: a blue image corresponding to the red-orange screened negative, a yellow image to the blue-violet screened negative and a red image to the green screened negative.

The film which will receive the three prints is coated on one face with an ordinary gelatino-bromide layer and on the other face with a neutral gelatine layer.

The blue image is first printed by utilizing the gelatino-bromide layer which is exposed behind the red-orange screened negative, and developed to obtain first a black silver print which is then toned into blue in any well known manner.

The yellow and red images must then be printed on the same film. This can be done by the process known under the name of pinatype. According to this process, the film is first dipped into a solution of alkaline bichromate to impregnate the gelatine layers on both faces, and then dried.

Black positive plates or films are then obtained from the negatives corresponding to the blue and green and these positives are used for printing the two layers of bichromated gelatine obtained as described above.

Both the yellow and the red printings are carried out simultaneously as shown on the annexed drawing in which the thickness of the film has been considerably exaggerated for the sake of clearness.

The figure is a side elevation showing the films greatly enlarged.

In this drawing 1 is the positive film, 2 is the bichromated gelatine layer on which the blue image has already been produced and 3 is the simple bichromated gelatine layer.

The positive film corresponding to blue-violet, which must be printed in yellow is placed at 4, against the layer 2 with its face 5 bearing the positive image away from the layer 2. Simultaneously the positive film corresponding to green, which must be printed in red, is placed at 6, against the other face of the positive film 1, the face 7 which bears the image being in contact with the layer 3.

The exposure is made at the same time from both sides of the film by means of two sources of light such as 8 and 9, the color of the layers 2 and 3 being sufficient to prevent light from 8 acting upon the gelatine layer 3 or light from 9 acting upon the gelatine layer 2.

After exposure, the film is washed and preferably allowed to dry. It then carries two gelatine layers having insoluble parts corresponding to the yellow and red images.

The parts which are still soluble are then dyed, the dyeing being carried out simultaneously on both sides in the following manner:

Two strips of paper or similar material are covered with a gelatine layer. The gelatine of one strip contains a red dyestuff and the other contains a yellow dye-stuff. Both strips are moistened and applied on both sides of the positive film. The film having been so covered is allowed to remain for a determined period in order to allow the dyeing-stuffs to diffuse from the colored gelatine to the soluble parts of the gelatine layers of the film.

The positive film is then dried and is ready for use.

This process has been particularly described above with reference to the production of colored cinematograph films, but it can also be used from producing ordinary colored photographs.

The invention is not limited to the method exactly as described and deviation therefrom, such as a change in the selection of colors, in the order in which they are printed on the positive film or other similar alternations can be made without exceeding the scope of the invention.

I claim:

1. A method of producing a three colored film including printing a blue image on one face of a film coated on one side with a gelatine bromide layer and on the other with a neutral gelatine layer, coating the film with a solution of alkaline bichromate, printing simultaneously on each side of the film a yellow and red image respectively, drying the film, and applying a colored gelatine strip to each side of the film.

2. A method of producing a three colored film including printing a blue image on one face of the film, said film being previously coated on one side with a gelatine bromide layer and on the other with a neutral gelatine layer, coating the film with a solution of alkaline bichromate, printing simultaneously on each side of the film a different colored image, drying the film, and applying a coloring means to each side of the film.

3. A method of producing a three colored film including printing on one side of a film an image, applying a coating over said image, simultaneously printing on opposite sides of the film other images so that one is superposed on the first printed image and the other correspondingly placed on the side opposite, drying the film, and subjecting the soluble portions to differently colored gelatine strips.

In testimony whereof I affix my signature.

LÉON JEAN BAPTISTE DIDIER.